(12) United States Patent
Huang

(10) Patent No.: US 10,007,127 B1
(45) Date of Patent: Jun. 26, 2018

(54) NOSE BRACKET STRUCTURE FOR GLASSES

(71) Applicant: GEM OPTICAL CO., LTD., Taichung (TW)

(72) Inventor: Yen-Hung Huang, Taichung (TW)

(73) Assignee: GEM OPTICAL CO., LTD., Taichung (TW)

( * ) Notice: Subject to any disclaimer, the term of this patent is extended or adjusted under 35 U.S.C. 154(b) by 0 days. days.

(21) Appl. No.: 15/367,178

(22) Filed: Dec. 2, 2016

(51) Int. Cl.
G02C 5/12 (2006.01)
G02C 5/00 (2006.01)
G02C 1/04 (2006.01)

(52) U.S. Cl.
CPC ............... G02C 5/12 (2013.01); G02C 1/04 (2013.01); G02C 5/008 (2013.01); *G02C 2200/16* (2013.01)

(58) Field of Classification Search
CPC . G02C 5/12; G02C 5/008; G02C 1/04; G02C 2200/16
USPC .................................................. 351/136, 41
See application file for complete search history.

(56) References Cited

U.S. PATENT DOCUMENTS

| 7,524,055 | B2* | 4/2009 | Schepke | G02C 1/04 351/103 |
| 7,594,723 | B2* | 9/2009 | Jannard | G02C 1/04 351/106 |
| 2011/0317122 | A1* | 12/2011 | Havens-Olmstead | G02C 5/12 351/136 |

* cited by examiner

*Primary Examiner* — Tuyen Tra

(57) ABSTRACT

A nose bracket structure for glasses contains: a lens assembly (10) and a supporter (20). The lens assembly (10) includes a holding extension (11), a first fastener (12), a first retaining portion (13), and two locking segments (14). The supporter (20) is made of elastic plastic material which is silicon dioxide, and the supporter (23) includes a connection portion (21), a holding portion (27) one-piece formed on a rear end of the connection portion (21), and a second fastener (22) one-piece formed and corresponding to the first fastener (12). The second fastener (22) has a guiding orifice (24), a stopping space (25), and an engagement face (26), wherein the guiding orifice (24) is made of elastic plastic material so that the two locking segments (14) of the first fastener (12) force into the guiding opening (24) and retain with the engagement face (26).

5 Claims, 8 Drawing Sheets

NOSE BRACKET STRUCTURE FOR GLASSES

BACKGROUND

The present invention relates to a nose bracket structure for glasses which is simplified and has low production cost.

BRIEF SUMMARY OF INVENTION

As shown in FIGS. 1 and 2, a conventional nose bracket for glasses contains: a glasses frame 1, a lens assembly 2, and a supporter 3 arranged on a bottom of a central portion of the lens assembly 2, wherein the supporter 3 includes a holding portion 4 and a connector 7. The connector 7 has multiple columns 8, the lens assembly 2 has multiple through holes 6 corresponding to the multiple columns 8 of the connector 7 respectively, hence the multiple columns 8 extend out of the multiple holes 6. The holding portion 4 has multiple connection orifices 5 corresponding to the multiple columns 8 of the connector 7 individually so that the multiple columns 8 insert into the multiple connection orifices 5 of the holding portion 4 via the multiple through holes 6, respectively, thus connecting the supporter 3 and the lens assembly 2 together. However, the supporter 3 is complicated and has high production cost.

The primary objective of the present invention is to provide a nose bracket structure for glasses in which the supporter and the body are connected firmly and efficiently.

Another objective of the present invention is to provide a nose bracket structure for glasses which is assembled quickly and has low assembly cost.

DETAILED DESCRIPTION OF DRAWINGS

Figure 1:
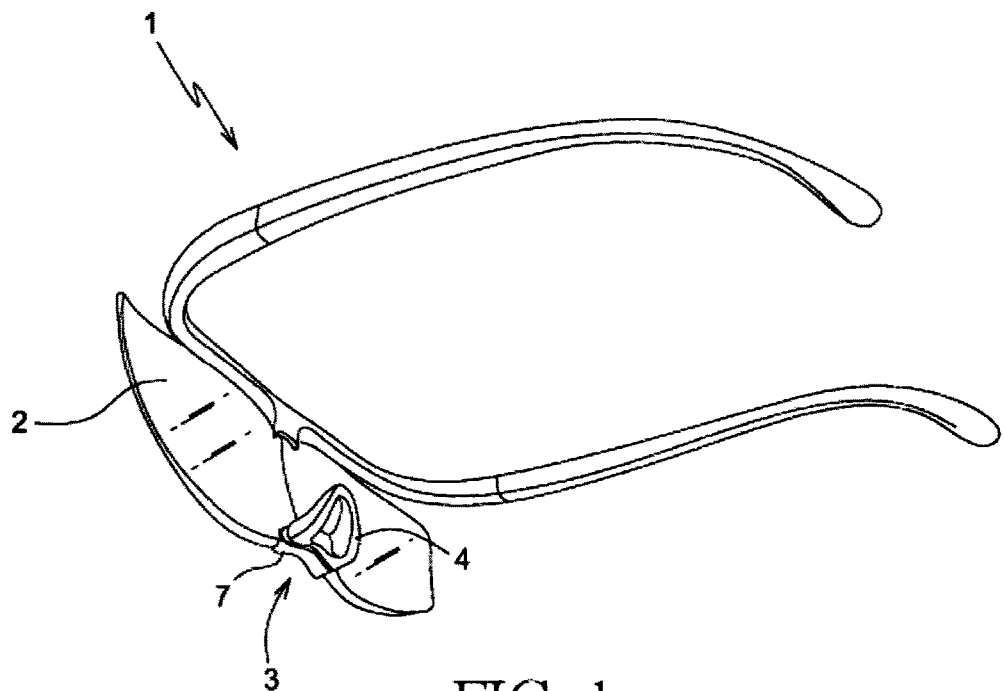
FIG. 1 is a perspective view showing the assembly of conventional nose bracket structure for glasses.
Figure 2:
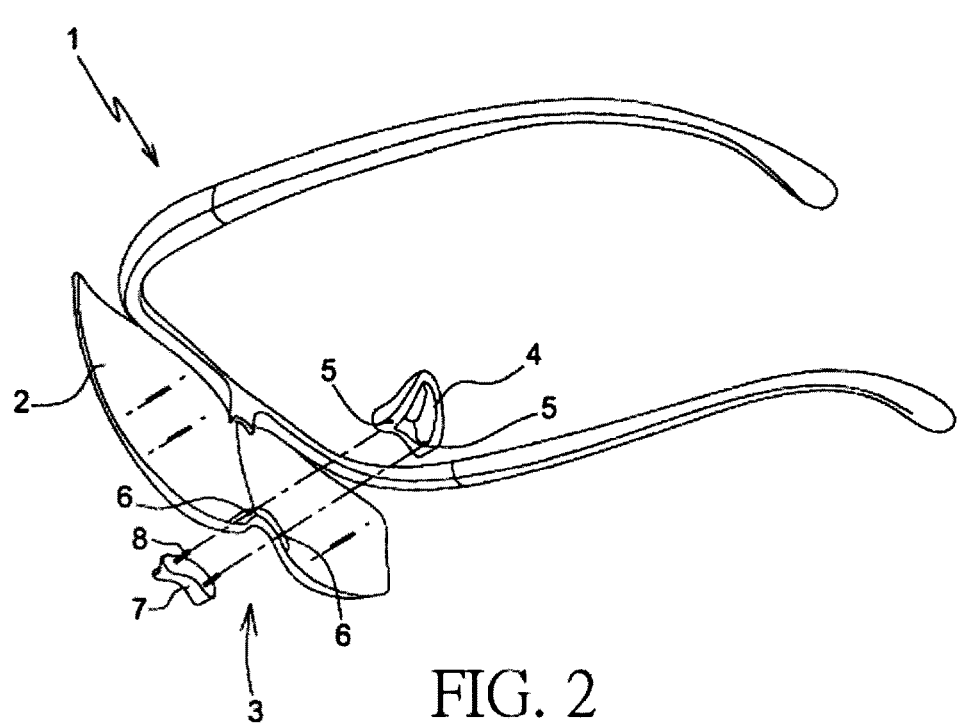
FIG. 2 is a perspective view showing the exploded components of the conventional nose bracket structure for glasses.
Figure 3:
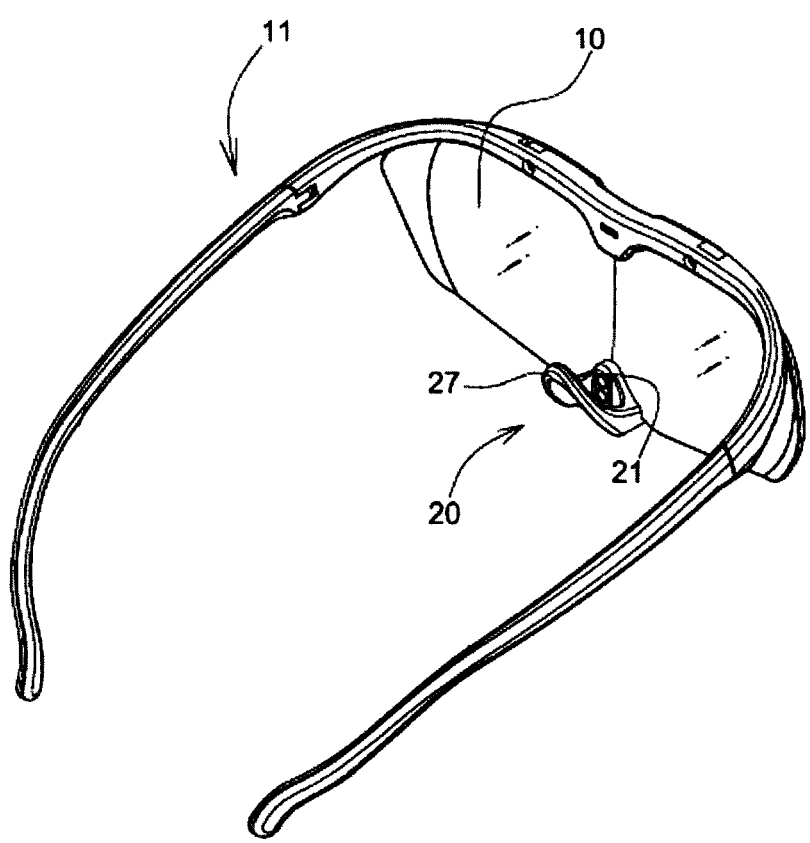
FIG. 3 is a perspective view showing the assembly of a nose bracket structure for glasses in accordance with a preferred embodiment of the present invention.
Figure 4:
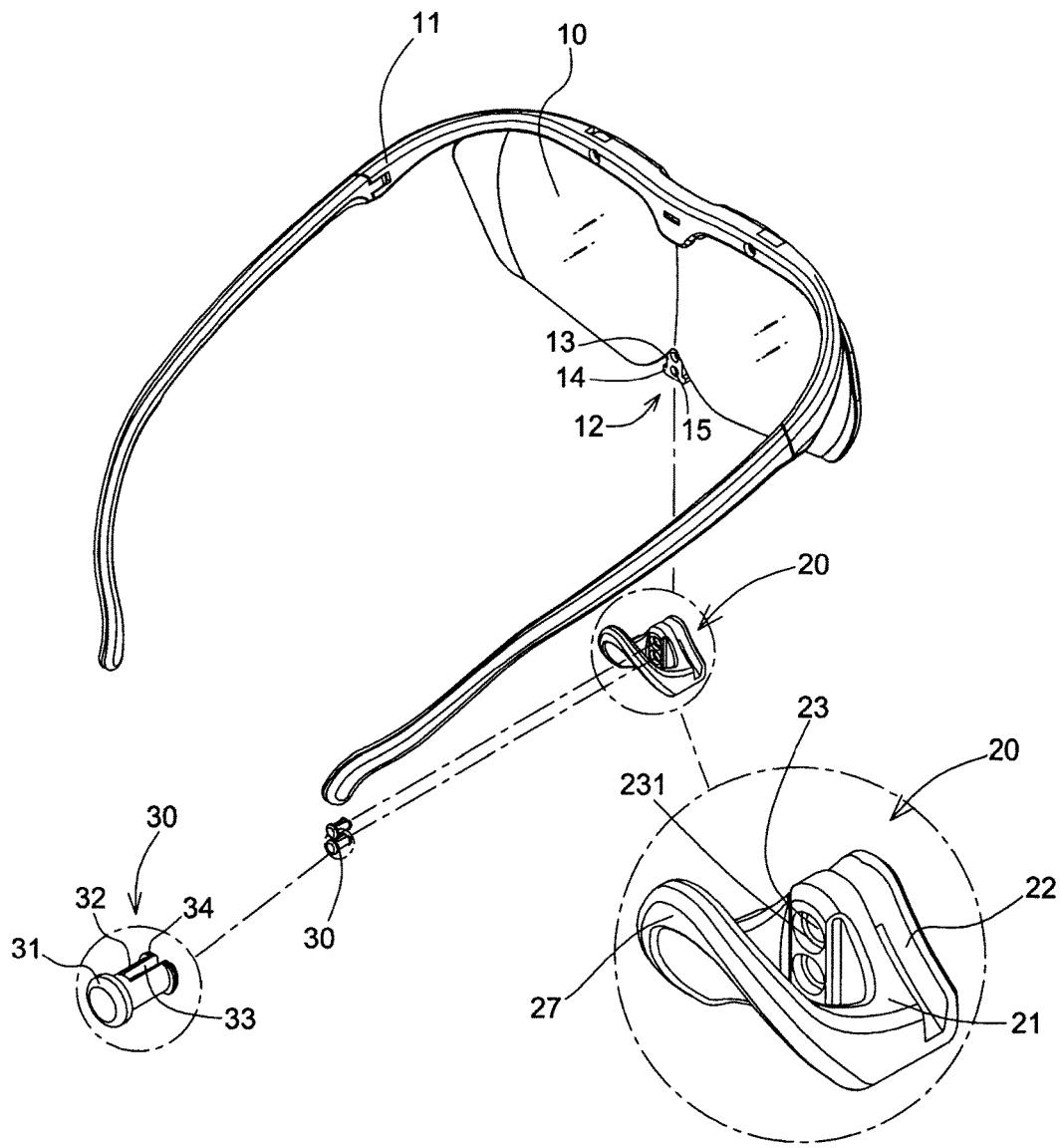
FIG. 4 is a perspective view showing the exploded components of the nose bracket structure for the glasses in accordance with the preferred embodiment of the present invention.
Figure 5:
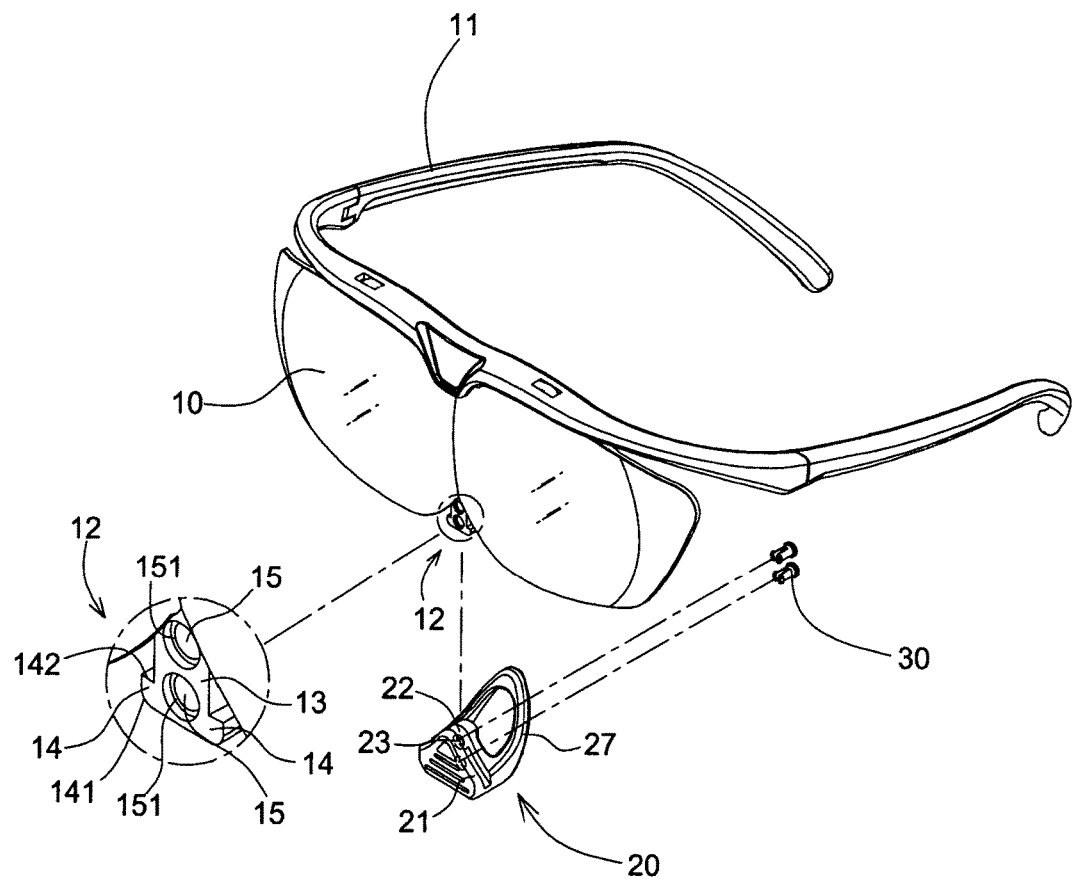
FIG. 5 is another perspective view showing the exploded components of the nose bracket structure for the glasses in accordance with the preferred embodiment of the present invention.
Figure 6:
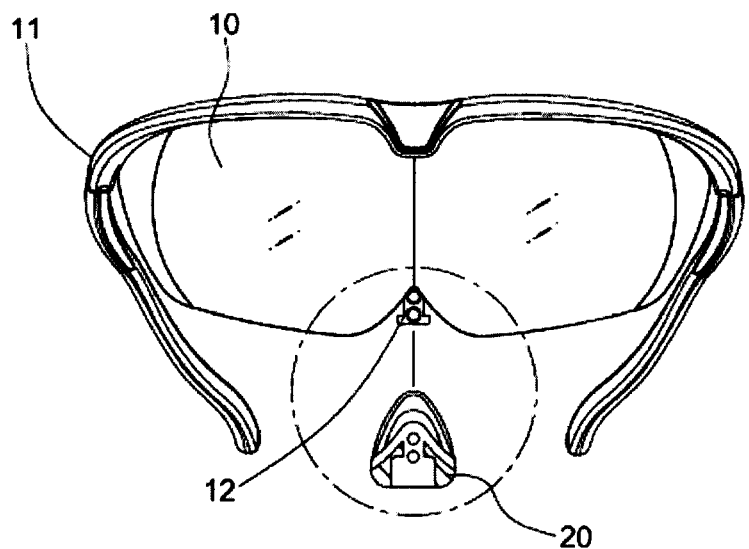
FIG. 6 is a cross-sectional perspective view showing the exploded components of the nose bracket structure for the glasses in accordance with the preferred embodiment of the present invention.
Figure 7:
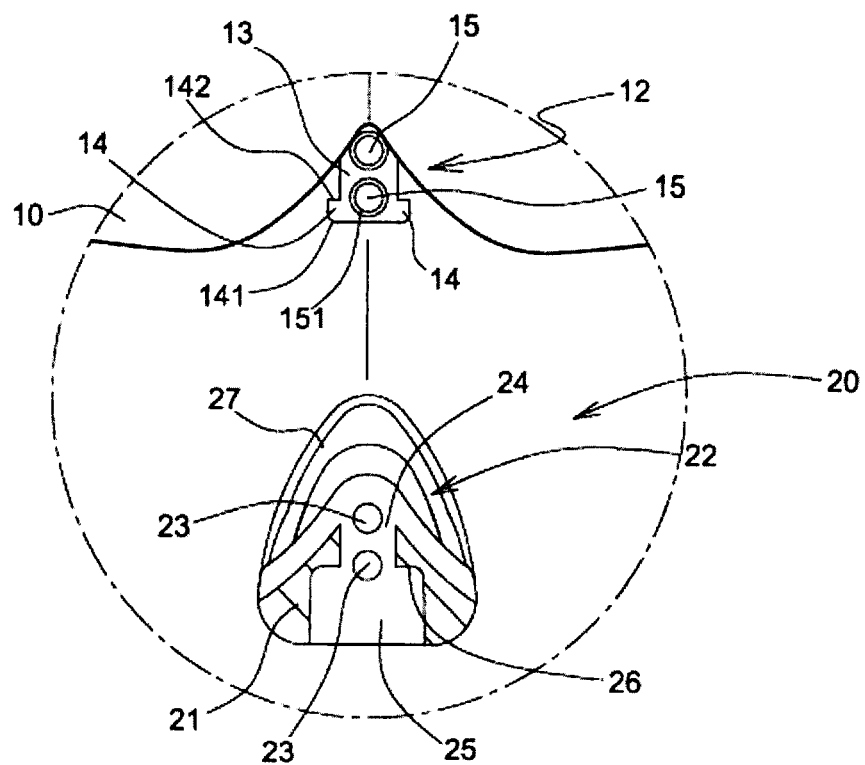
FIG. 7 is an amplified cross-sectional perspective view of FIG. 6.
Figure 8:
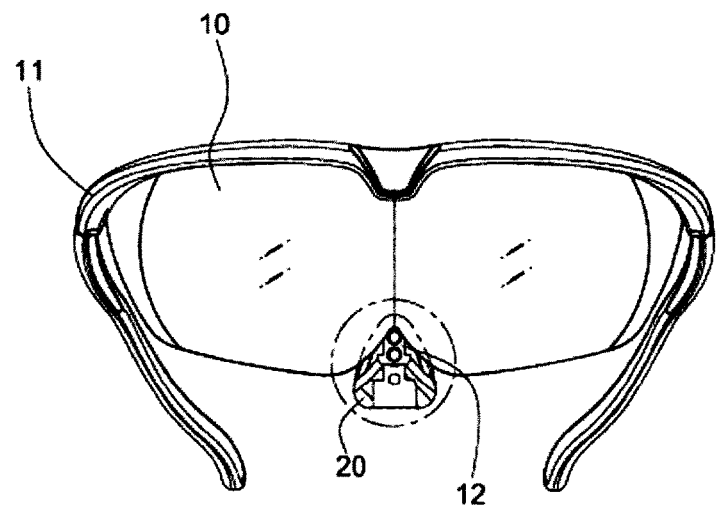
FIG. 8 is a cross-sectional perspective view showing the operation of the nose bracket structure for the glasses in accordance with the preferred embodiment of the present invention.
Figure 9:
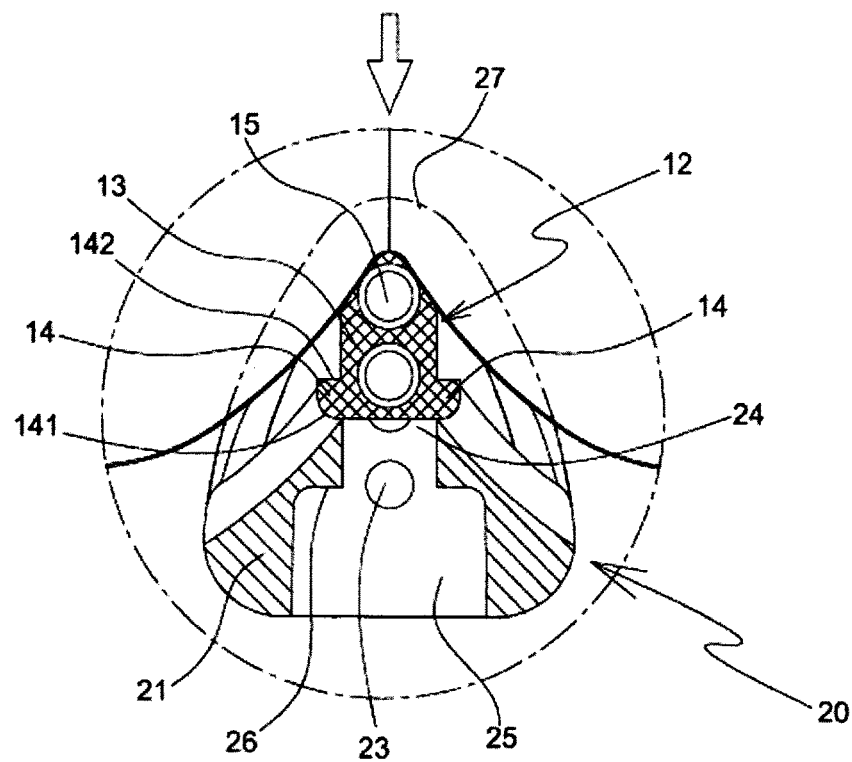
FIG. 9 is an amplified cross-sectional perspective view of FIG. 8.
Figure 10:
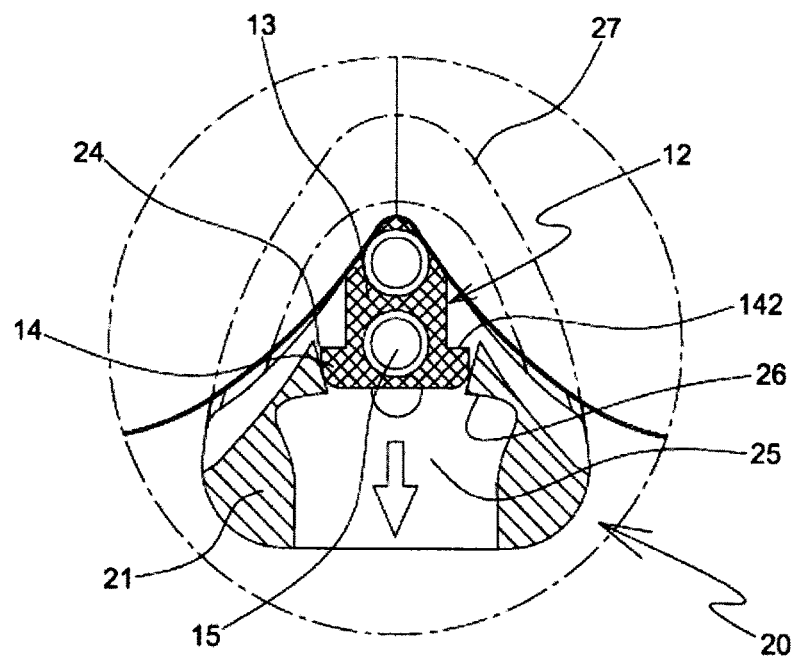
FIG. 10 is another cross-sectional perspective view showing the operation of the nose bracket structure for the glasses in accordance with the preferred embodiment of the present invention.
Figure 11:
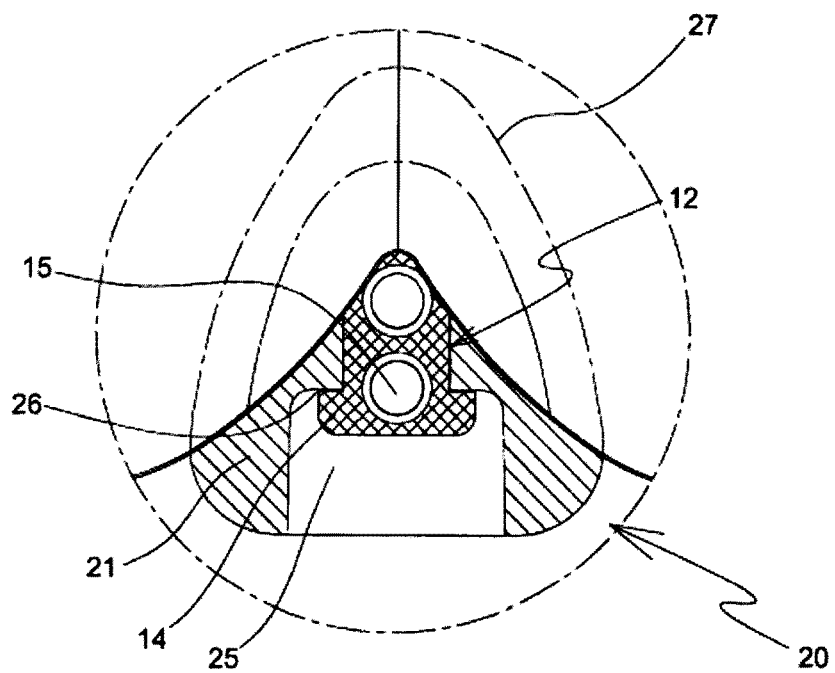
FIG. 11 is also another cross-sectional perspective view showing the operation of the nose bracket structure for the glasses in accordance with the preferred embodiment of the present invention.

Referring to the drawings and initially to FIGS. 3-13, a nose bracket structure for glasses in accordance with a preferred embodiment of the present invention comprises:

a lens assembly 10 including a holding extension 11, a first fastener 12 extending downwardly from a bottom of a central portion of the lens assembly 11, a first retaining portion 13, and two locking segments 14 extending downwardly from two ends of the first retaining portion 13, respectively;

a supporter 20 made of elastic plastic material which is silicon dioxide, and the supporter 23 including a connection portion 21, a holding portion 27 one-piece formed on a rear end of the connection portion 21 so as to contact user's nasal bridge, and a second fastener 22 one-piece formed and corresponding to the first fastener 12 of the lens assembly 10, wherein the second fastener 22 has a guiding orifice 24, a stopping space 25 formed on a distal end of the guiding orifice 24, and an engagement face 26 formed on two walls of the guiding orifice 25 relative to the guiding orifice 24, wherein the guiding orifice 24 is made of elastic plastic material so that the two locking segments 14 of the first fastener 12 force into the guiding opening 24 and retain with the engagement face 26 of the guiding orifice 25, as shown in FIGS. 9 to 11.

The first retaining portion 13 of the first fastener 12 of the lens assembly 10 has a guide face 141 formed on a bottom thereof and has a fastening face 142 formed on a top thereof so that when the first retaining portion 13 forces the guiding opening 24 of the second fastener 22 outwardly, the guide face 141 of the first retaining portion 13 contacts with the guiding opening 24 of the second fastener 22, the two locking segments 14 of the first fastener 12 force into the guiding opening 24, and the fastening face 142 of the first retaining portion 13 retains with the engagement face 26 of the second fastener 22.

Figure 12:
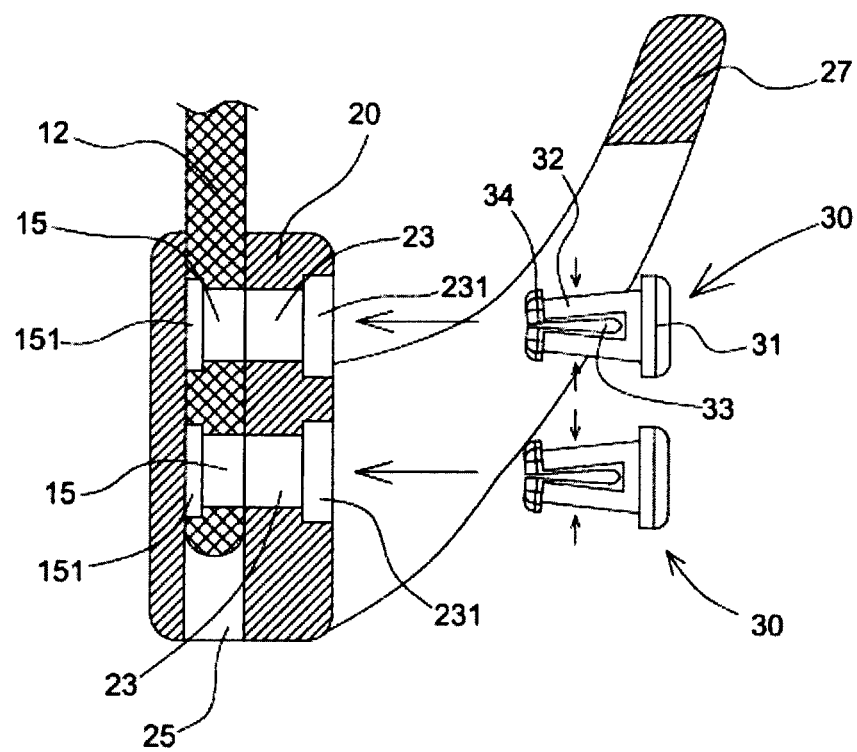
FIG. 12 is still another cross-sectional perspective view showing the operation of the nose bracket structure for the glasses in accordance with the preferred embodiment of the present invention.
Figure 13:
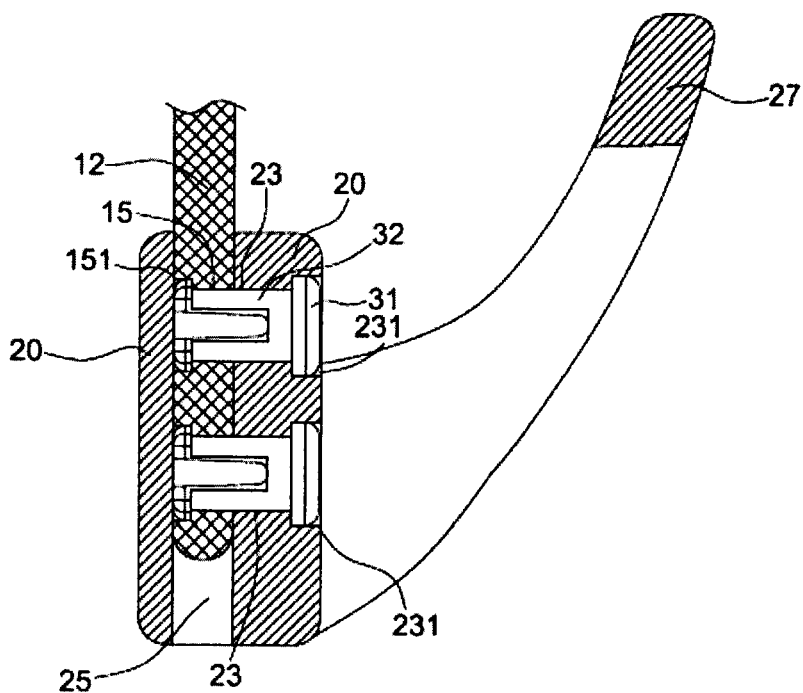
FIG. 13 is also another cross-sectional perspective view showing the operation of the nose bracket structure for the glasses in accordance with the preferred embodiment of the present invention.

The first fastener 12 of the body 10 has multiple first through holes 15 corresponding to the second fastener 22 of the supporter 20, each of the first through holes 15 has a first stepped notch 151 defined on a front end thereof, and the second fastener 22 of the supporter 20 has multiple second through holes 23 corresponding to the multiple first through holes 12 individually, each of the multiple second though holes 23 has a second stepped notch 231 formed on a distal end thereof so that when the body 10 and the supporter 20 are connected together, said each first through hole 15 and said each second through hole 23 are connected with a fixing element made of elastic plastic material, wherein the elastic plastic material is silicon dioxide, and the fixing element has a head disc 31, a column 32 extending outwardly from the head disc 31, a slot 33 defined on the column 32, and an affix segment 34 formed on a distal end of the column 32 corresponding to the slot 33, such that the column 32 of the fixing element presses the slot 33 inwardly so that the affix segment 34 moves into the second through hole 23 and the first through hole 15 to retain with the first stepped slot 151 of the first through hole 15, and the head disc 31 of the fixing element is limited in the second stepped notch 231 of the second through hole 23, as illustrated in FIGS. 12-13.

Thereby, the supporter 20 and the body 10 are connected firmly and efficiently. Preferably, the supporter 20 is simplified and is one-piece formed so to reduce its production cost.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A nose bracket structure for glasses comprising:
a lens assembly including a holding extension, a first fastener extending downwardly from a bottom of a central portion of the lens assembly, a first retaining portion, and two locking segments extending downwardly from two ends of the first retaining portion, respectively;
a supporter made of elastic plastic material which is silicon dioxide, and the supporter including a connection portion, a holding portion one-piece formed on a rear end of the connection portion, and a second fastener one-piece formed and corresponding to the first fastener of the lens assembly, wherein the second fastener has a guiding orifice, a stopping space formed on a distal end of the guiding orifice, and an engagement face formed on two walls of the guiding orifice relative to the guiding orifice, wherein the guiding orifice is made of elastic plastic material so that the two locking segments of the first fastener force into the guiding opening and retain with the engagement face of the guiding orifice.

2. The nose bracket structure for glasses of claim 1, wherein the elastic plastic material of the guiding orifice is silicon dioxide.

3. The nose bracket structure for glasses of claim 1, wherein the first retaining portion of the first fastener of the lens assembly has a guide face formed on a bottom thereof and has a fastening face formed on a top thereof so that when the first retaining portion forces the guiding opening of the second fastener outwardly, the guide face of the first retaining portion contacts with the guiding opening of the second fastener, the two locking segments of the first fastener force into the guiding opening, and the fastening face of the first retaining portion retains with the engagement face of the second fastener.

4. The nose bracket structure for glasses of claim 1, wherein the first fastener of the body has multiple first through holes corresponding to the second fastener of the supporter, each of the first through holes has a first stepped notch defined on a front end thereof, and the second fastener of the supporter has multiple second through holes corresponding to the multiple first through holes individually, each of the multiple second though holes has a second stepped notch formed on a distal end thereof so that when the body and the supporter are connected together, said each first through hole and said each second through hole are connected with a fixing element made of elastic plastic material, wherein the fixing element has a head disc, a column extending outwardly from the head disc, a slot defined on the column, and an affix segment formed on a distal end of the column corresponding to the slot.

5. The nose bracket structure for glasses of claim 4, wherein the elastic plastic material of the fixing element is silicon dioxide.

* * * * *